United States Patent
Kluge et al.

(10) Patent No.: US 9,829,024 B2
(45) Date of Patent: Nov. 28, 2017

(54) FASTENING ELEMENT

(71) Applicant: ILLINOIS TOOL WORKS INC., Glenview, IL (US)

(72) Inventors: Martin Kluge, Röttingen (DE); Floris Somers, Frankfurt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/890,198

(22) PCT Filed: Apr. 8, 2014

(86) PCT No.: PCT/US2014/033271
§ 371 (c)(1),
(2) Date: Nov. 10, 2015

(87) PCT Pub. No.: WO2014/186067
PCT Pub. Date: Nov. 20, 2014

(65) Prior Publication Data
US 2016/0131169 A1     May 12, 2016

(30) Foreign Application Priority Data
May 17, 2013   (DE) .................. 10 2013 008 432

(51) Int. Cl.
*F16B 39/02*   (2006.01)
*F16B 11/00*   (2006.01)
*F16B 37/04*   (2006.01)
*F16B 5/00*    (2006.01)

(52) U.S. Cl.
CPC .............. *F16B 11/006* (2013.01); *F16B 5/00* (2013.01); *F16B 37/048* (2013.01)

(58) Field of Classification Search
CPC .......... F16B 11/006; F16B 5/00; F16B 37/048
USPC ........................................... 411/82, 180
See application file for complete search history.

(56) References Cited

U.S. PATENT DOCUMENTS 1,435,134 A * 11/1922 Boley ..................... E04D 5/145
                                                  411/487
1,495,134 A *  5/1924 Redmond ................. A41B 9/08
                                                  2/111
3,532,316 A * 10/1970 Mathes ................. B01F 5/0646
                                                  156/242

(Continued)

FOREIGN PATENT DOCUMENTS

DE     10143542 A1    3/2003
EP     0 900 944      * 3/1999 .............. F16B 37/04

OTHER PUBLICATIONS

ISR and WO for PCT/US2014/033271 dated Jul. 29, 2014.

*Primary Examiner* — Gary Estremsky
(74) *Attorney, Agent, or Firm* — Hauptman Ham, LLP

(57) ABSTRACT

The invention relates to a fastening element for fastening a component on a carrier component, in particular a carrier component of an automobile, wherein the fastening element comprises a glue surface with which the fastening element can be glued onto the earner component with a glue applicable to the glue surface, and wherein the fastening element comprises fastening means for fastening the component or a further fastening element, wherein a plurality of anchoring ribs are provided on the glue surface, which extend in a radial direction with regard to an imaginary circle around the center of the glue surface.

22 Claims, 5 Drawing Sheets

(56) References Cited

U.S. PATENT DOCUMENTS

| | | | | |
|---|---|---|---|---|
| 4,018,257 A | * | 4/1977 | Jack | B23P 19/062 |
| | | | | 29/432 |
| 4,462,194 A | * | 7/1984 | Wahner | B32B 5/24 |
| | | | | 411/510 |
| 4,751,802 A | * | 6/1988 | Whitman | E04D 5/148 |
| | | | | 52/410 |
| 4,763,456 A | * | 8/1988 | Giannuzzi | E04D 3/3603 |
| | | | | 411/133 |
| 4,780,039 A | * | 10/1988 | Hartman | E04D 3/3603 |
| | | | | 411/369 |
| 5,069,589 A | * | 12/1991 | Lemke | E04D 5/145 |
| | | | | 411/160 |
| 5,756,185 A | * | 5/1998 | Lesser | B29C 45/0053 |
| | | | | 24/289 |
| 6,220,804 B1 | * | 4/2001 | Pamer | F16B 37/068 |
| | | | | 29/432.2 |
| 7,815,406 B2 | * | 10/2010 | Babej | B23P 19/062 |
| | | | | 411/181 |
| 7,891,151 B2 | * | 2/2011 | Sano | B62D 25/2072 |
| | | | | 296/97.23 |
| 2010/0313517 A1 | * | 12/2010 | Clinch | F16B 5/01 |
| | | | | 52/704 |
| 2011/0176863 A1 | * | 7/2011 | Hanley | B60R 13/0206 |
| | | | | 403/267 |

* cited by examiner

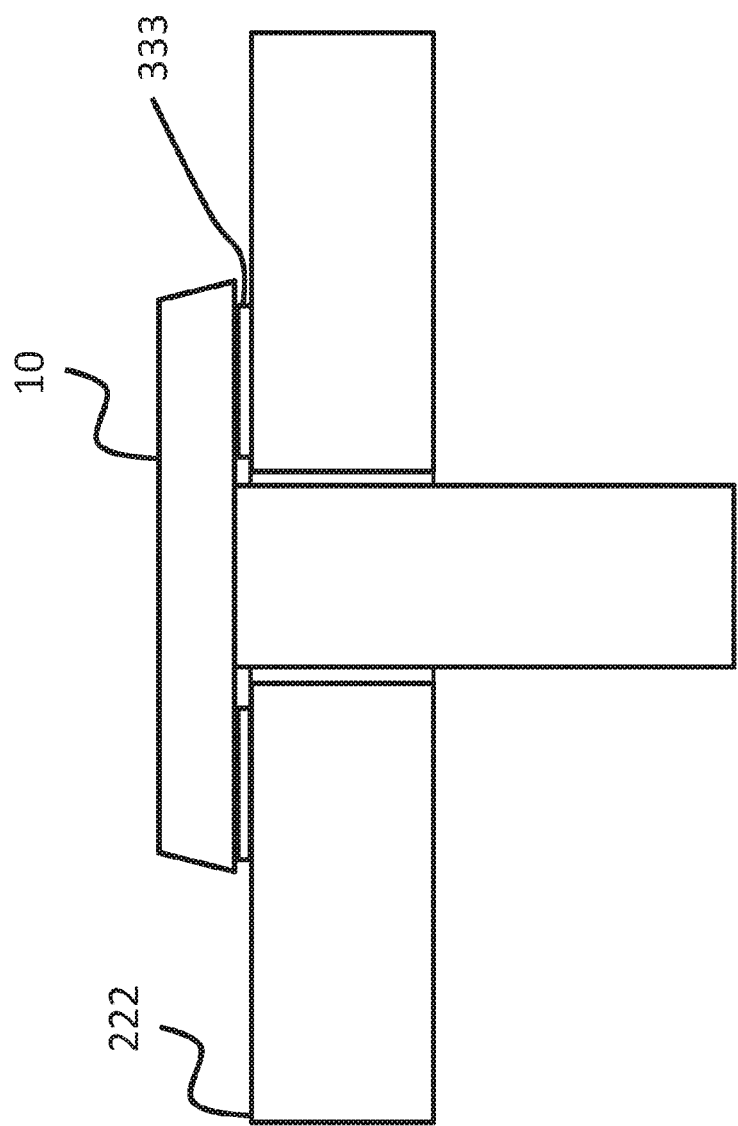

FASTENING ELEMENT

RELATED APPLICATIONS

The present application is a National Phase of International Application Number PCT/US2014/033271, filed Apr. 8, 2014, and claims priority to German Application Number 10 2013 008 432.6, filed May 17, 2013.

The invention relates to a fastening element for fastening a component on a carrier component, in particular a carrier component of an automobile, wherein the fastening element comprises a glue surface with which the fastening element can be glued onto the carrier component with a glue applicable to the glue surface, and wherein the fastening element comprises fastening means for fastening the component or a further fastening element. The invention also relates to a fastening device, to a carrier component and to a system of a carrier component and a fastening element.

Fastening elements of the type mentioned at the beginning are connected, for example, to a body part of an automobile. Subsequently, a component to be fastened to the body part, or a second fastening element, is fastened to the fastening means of the fastening element. In the last-mentioned case, a component to be fastened to the body part is generally held between opposite bearing surfaces of the two fastening elements. In automobiles, use is increasingly made, even in the body region, of fiber reinforced plastics, for example carbon fiber reinforced plastics. In the case of fiber reinforced plastics, the fastening elements frequently have to be glued on the carrier component. For this purpose, the fastening elements have a glue surface which is provided with a glue and with which the fastening elements are then glued on the carrier component. In the event of assembly and disassembly and also during operation, fastening elements of this type are exposed to high forces, in particular high torsional forces or shearing forces. This imposes high demands on the glued joint. In order to achieve a better connection of the glue to the fastening element and therefore to the carrier component, it is known to form the glue surface with a roughened structure rather than being completely smooth. Frequently, however, the durability to torsional or shearing forces needs to be increased even further. It is likewise already known for this purpose to provide the glue surface with a plurality of through bores through which the glue flows onto the fastening element side during the course of the gluing. This results in a better connection of the glue. However, an undesirable contact of the glue with the fastening means frequently occurs in this case, which has an adverse effect on the function of the fastening means, for example a thread or latch means.

Starting from the explained prior art, the invention is based on the object of providing a fastening element, a fastening device, a carrier component and a system of the type mentioned at the beginning, with which greater durability in particular to torsional and shearing forces is achieved.

The invention achieves the object by means of the subject matter of claims 1, 13, 14 and 15. Advantageous refinements are found in the dependent claims, the description and the figures.

For a fastening element of the type mentioned at the beginning, the invention achieves the object in that a plurality of anchoring ribs are provided on the glue surface, which extend at least in sections, preferably fully, in a radial direction with regard to an imaginary circle around the center of the glue surface.

The fastening element according to the invention is glued with the glue surface thereof onto a carrier component in a manner known per se. The carrier component can be composed of a fiber reinforced plastic, for example a carbon fiber reinforced plastic (CFP) or a glass fiber reinforced plastic (GFP). The carrier component can be a body part of an automobile. The component to be fastened thereon can be, for example, a lining part or another component of an automobile. For the gluing on the carrier component, the glue surface is provided over the full surface area or in sections with a generally initially flowable glue and is pressed onto the carrier component, wherein the glue cures. Subsequently, the component to be fastened on the carrier component can be fastened directly to the fastening means of the fastening element. However, indirect fastening is also possible, in which a further fastening element is fastened to the fastening means of the fastening element, wherein the component to be fastened to the carrier component is held, for example, between mutually facing bearing surfaces of the two fastening elements.

In order to achieve increased durability of the fastening element to torsional and shearing forces, anchoring ribs or anchoring webs which are heightened with regard to the glue surface and which extend in a radial direction on the glue surface are provided, according to the invention, on the glue surface. It is entirely possible here for the anchoring ribs to extend at least in sections at a small angle of, for example, less than 10° with respect to the radial direction. However, the anchoring ribs always have an extent in the radial direction. The glue surface of the fastening element according to the invention can be annular, for example. An annular glue surface can be provided in particular if the fastening means of the fastening element, which fastening means extend through a passage bore in the carrier component in the fitted state, are located in the center of the glue surface. However, the glue surface may also be designed with a closed center, in particular if the fastening means are located only on that side of the fastening element which faces away from the glue surface. In particular in the case of an annular glue surface, the center is therefore not located on the glue surface. The anchoring ribs provided according to the invention then extend in a radial direction with regard to a circle placed around the center, that is to say the geometrical center point or center of gravity of the glue surface. The anchoring ribs can be arranged here distributed uniformly over the glue surface. In particular, the anchoring ribs can be arranged at identical angular spacings on the glue surface.

According to the invention, the glue is connected to the anchoring ribs. The anchoring ribs thus lead to an improved connection of the glue to the glue surface and therefore to the fastening element, and hence also to an improved connection of the fastening element to the carrier component. When glued onto a carrier component, the fastening element according to the invention therefore has greater durability to torsional and shearing forces, as may occur within the course of the assembly or disassembly or else during operation. It has been shown in particular that anchoring ribs of this type considerably more effectively can out this function than a surface which is roughened or structured in some other undefined manner. The increased durability is made possible in particular by means of the mechanical connection, which is added by the anchoring ribs, in comparison to the glued joint which is merely present otherwise. By means of a suitable configuration of the anchoring ribs, an optimum flow of the glue on the glue surface and therefore a uniform distribution of glue are made possible at the same time during the gluing. The glue to be applied to the glue surface can be a single-component or two-component glue. Said glue can cure, for example, chemically and/or thermally and/or by means of UV radiation.

According to one refinement, the glue surface can be closed. The glue surface therefore then does not have any (axial) passage holes through which a glue impairing the function of the fastening means can pass, in particular onto the side facing away from the glue surface and therefore from the carrier component. This side generally bears the fastening means. The closed glue surface therefore ensures that the function of the fastening means cannot be impaired by glue. It should be pointed out that it is entirely possible to form equalizing or ventilation holes in the glue surface or in a boundary of the glue surface, in particular when glues curing exothermically are used. Said equalizing or ventilation holes then, however, have such a small cross section that no quantities of glue impairing the function of the fastening means, preferably no glue at all, can pass through said holes.

The glue surface can have a circular shape or a circular ring shape, Wherein the anchoring ribs then extend in a radial direction with regard to the circular shape or the circular ring shape of the glue surface.

Furthermore, some or all of the anchoring ribs can extend continuously between an inner boundary or a center of the glue surface and an outer boundary of the glue surface. In the case of an annular glue surface, for example a glue surface with a circular ring shape, the anchoring ribs in this refinement extend continuously, as seen in the radial direction, between the radially inner and the radially outer edge of the annular glue surface. In the case of glue surfaces with a closed center, for example a closed circular glue surface, the anchoring ribs in this refinement extend continuously from the center point of the glue surface as far as an outer edge of the glue surface. In particular, a star-shaped arrangement of the anchoring ribs can be provided.

Some or all of the anchoring ribs can also extend noncontinuously between an inner boundary or a center of the glue surface and an outer boundary of the glue surface. In this refinement, the anchoring ribs therefore, as seen in the radial direction, in each case have at least one interruption or extend only over a radial subsection. It is then furthermore possible for all or some of the anchoring ribs to extend in an alternating manner, as seen in the circumferential direction, from the inner boundary or the center of the glue surface and from the outer boundary of the glue surface. An offset arrangement of the anchoring ribs leads to particularly good shearing and torsional strength and to a reduced flow obstruction to glue applied to the glue surface.

Furthermore, some or all of the anchoring ribs can extend along a wave form in the radial direction, for example in an S-shaped manner. The anchoring ribs continue here still to extend in the radial direction, but have a wavy profile. In particular, a straight line placed through said wavy profile runs in the radial direction. This refinement also leads to particularly good shearing and torsional strength.

Some or all of the anchoring ribs can comprise at least one deepening along their radial extension, through which deepening glue can flow when the fastening element is glued onto the carrier component. Such deepenings continue to still be heightened with regard to the surrounding glue surface, and therefore form part of the respective anchoring rib. However, within the course of the gluing onto the carrier component, the glue which has not yet cured at this time and is therefore still flowable can flow. The deepenings improve a uniform distribution of the glue over the glue surface, in particular if said glue has previously been applied only in sections on the glue surface.

Some or all of the anchoring ribs can also have a changing height in the radial direction, for example a height which rises or drops in a ramp-like manner in sections or continuously in the radial direction. This refinement also helps to even out the distribution of the glue over the glue surface.

The glue surface can comprise a ring-shaped circumferential inner boundary heightened with regard to the glue surface and/or a ring-shaped circumferential outer boundary heightened with regard to the glue surface. The boundaries prevent the glue from being able to flow off unhindered inward or outward from the glue surface. In addition, the boundary (boundaries) ensure(s) a minimum layer thickness of the glue located on the glue surface. The boundaries form a boundary for glue applied to the glue surface. The inner and/or outer boundaries can be elastic in order to simplify the pressing of the fastening element onto the carrier component. Some or all of the anchoring ribs here can have the same height as the inner boundary and/or the outer boundary. This further improves the connection of the fastening element to the carrier component, since it is ensured that the anchoring ribs are always securely glued. The inner boundary can be formed by the fastening means, for example if the fastening means comprise an internal thread in the manner of a dowel which is placed through a passage bore in the carrier component during the gluing. A dowel which does not have an internal thread, but into the internal surface of which a tapping screw is screwed, is also possible, for example, as a fastening element.

The inner boundary and/or the outer boundary can comprise at least one interruption. When the fastening element is glued onto the carrier component, glue can flow through the interruption. In the event of an excess quantity of glue on the glue surface, such an interruption permits the excess glue which has not yet cured and is therefore still flowable to flow off outward or inward from the glue surface, and therefore the connection of the fastening element to the carrier component is not impaired. Such an interruption can also carry out a ventilation function, for example in the case of glues curing exothermically.

The fastening means of the fastening element can comprise thread means or latch means in a manner known per se. For example, the fastening means can be formed by a threaded bolt or an internal thread of a hollow cylindrical dowel. As mentioned, a dowel, for example, is also possible as the fastening element, said dowel not having an internal thread, but into the internal surface of the dowel a tapping screw is screwed, the screw then forming an internal thread. The latch means can be formed by suitable elastic latch elements or the like. The optionally provided further fastening element then has corresponding fastening means, i.e. likewise has thread means or latch means, and therefore the fastening means of the fastening elements can come into engagement with one another.

The invention correspondingly also relates to a fastening device comprising a first fastening element formed in the manner according to the invention and a second fastening element, which comprises fastening means corresponding to the fastening means of the first fastening element.

The invention also relates to a carrier component comprising a fastening element according to the invention which is glued onto the carrier component with its glue surface with glue.

Finally, the invention also relates to a system of such a carrier component and a component fastened on the fastening means of the fastening element or a further fastening element fastened on the fastening means of the fastening element.

Exemplary embodiments of the invention are explained in more detail below with reference to figures, in which, schematically:

FIG. 1 shows a fastening element according to the invention in a perspective view from above.

FIG. 2 shows the fastening element from FIG. 1 in a perspective view from below, FIG. 3 shows a fastening element according to the invention according to a further exemplary embodiment, in a perspective view from below, FIG. 4 shows a fastening element according to the invention according to a further exemplary embodiment, in a perspective view from below, FIG. 5 shows a fastening element according to the invention according to a further exemplary embodiment, in a perspective view from below, and FIG. 6 shows a fastening element according to the invention according to a further exemplary embodiment, in a perspective view from below.

Figure 1:
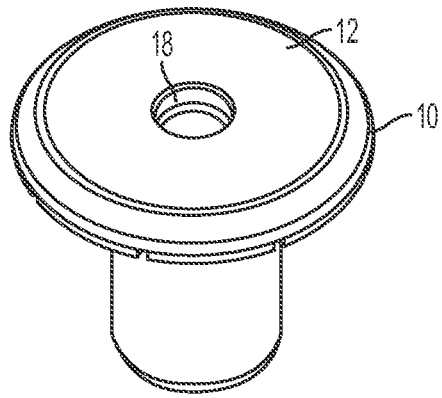

FIG. 9 depicts the fastening device 10 glued to component 222 with glue 333 (the drawing of FIG. 9 is presented in black-box format to present a visual depiction of the general concept of the glue and the component vis-à-vis the fastening device, and no specific structure or dimensions is presented thereby).

Unless otherwise stated, the same reference numbers in the figures refer to the same objects. The fastening element according to the invention shown in FIGS. 1 and 2 has a flat bearing section 10, the upper side 12 of which, which can be seen in FIG. 1, forms a bearing surface for a component which is to be fastened on a carrier component by the fastening element. The lower side of the bearing section 10, which lower side can be seen in FIG. 2, forms a glue surface 14 which, in the example shown, extends in a circular ring shape about a central, hollow cylindrical section 16. The glue surface 14 is closed, i.e. does not have any passage bores through the surface thereof. The hollow cylindrical section 16 is closed on the lower side thereof which can be seen in FIG. 2. It can be seen in FIG. 1 that the upper side 12 of the bearing section 10 has a central passage bore 18. The inside of the hollow cylindrical section has an internal thread which forms fastening means of the fastening element. The hollow cylindrical section 16 is designed to be inserted through a suitable opening in a carrier component, wherein the fastening element is glued on a facing surface of the carrier component with glue applied to the glue surface 14. A component to be fastened on the carrier component can subsequently be placed onto the upper side 12 of the bearing section 10, which upper side forms the bearing surface, in such a manner that a passage bore in the component is aligned with the passage bore 18 in the bearing section 10. Subsequently, a second fastening element (not shown) can be inserted, in particular screwed, into the hollow cylindrical section 16 through the passage bore in the component and the passage bore 18 in the bearing section 10 by a threaded bolt forming fastening means of the second fastening element. The second fastening element (not shown) has a bearing surface opposite the upper side 12 of the bearing section 10, wherein the component is securely held between the bearing surfaces of the two fastening elements in the fitted state.

Figure 2:
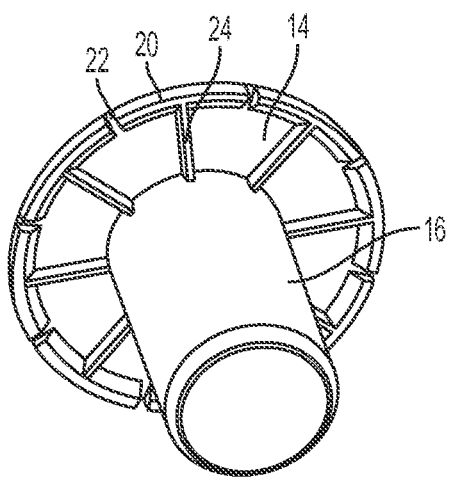

It can be seen in FIG. 2 that the outer edge of the glue surface 14 is surrounded by a ring-shaped outer boundary 20 heightened with regard to the glue surface 14. The outer boundary 20 has a plurality of interruptions 22 which are provided at regular angular spacings and through which excess glue during the gluing onto a carrier component can flow off outward. Furthermore, it can be seen in FIG. 2 that a plurality of anchoring ribs 24, which are likewise heightened with regard to the glue surface 14 and, in the example shown, have the same height as the outer boundary 20, are provided on the glue surface 14. In the example shown in FIG. 2, the anchoring ribs 24 extend continuously between the outer boundary 20 and the hollow cylindrical section 16, which forms an inner boundary of the glue surface 14, in a radial direction with regard to the circular ring shape of the glue surface 14. In the example shown, the anchoring ribs 24 are distributed uniformly over the glue surface, in particular at identical angular spacings from one another. In addition, it can be seen that the interruptions 22 in the outer boundary 20 are in each case formed centrally between adjacent anchoring ribs 24.

Figure 3:
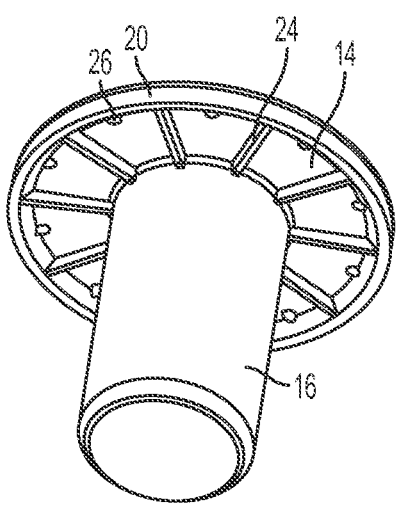

The exemplary embodiment which can be seen in FIG. 3 substantially corresponds to the exemplary embodiment of FIGS. 1 and 2. The sole difference is that, in the exemplary embodiment of FIG. 3, the outer boundary 20 does not have any interruptions. For this purpose, in the exemplary embodiment of FIG. 3, passage bores 26 having a very small cross section and through which ventilation, in particular when glues curing exothermically are used, can take place are provided in each case centrally between the anchoring ribs 24, in the outer boundary 20.

Figure 4:
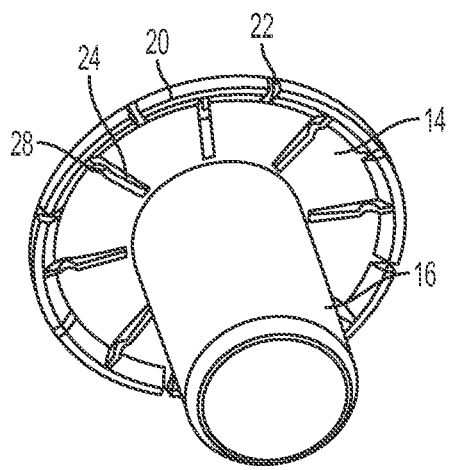

FIG. 4 illustrates a further exemplary embodiment which, in turn, substantially corresponds to the exemplary embodiment of FIGS. 1 and 2. The sole difference from the exemplary embodiment of FIGS. 1 and 2 regards the design of the anchoring ribs 24. Thus, in the exemplary embodiment of FIG. 4, the anchoring ribs 24 do not extend continuously between the outer boundary 20 and the hollow cylindrical section 16 forming the inner boundary. On the contrary, the anchoring ribs 24 in each case extend from the outer boundary 20 only over part of the radial extension of the glue surface 14, and therefore a clearance remains in each case between the anchoring ribs 24 and the cylindrical section 16. Furthermore, in the case of the exemplary embodiment of FIG. 4, the anchoring ribs in each case comprise a deepening 28, adjacent to the outer boundary 20 in the example shown. The deepenings 28 continue to be heightened with regard to the glue surface 14, but deepened with regard to the remaining surface of the anchoring ribs 24. In addition, it can be seen in FIG. 4 that the anchoring ribs 24 drop in a ramp-like manner in terms of the height thereof radially inward. The design of the anchoring ribs 24 according to FIG. 4 leads to a particularly uniform distribution of the glue over the glue surface 14 during the installation.

Figure 5:
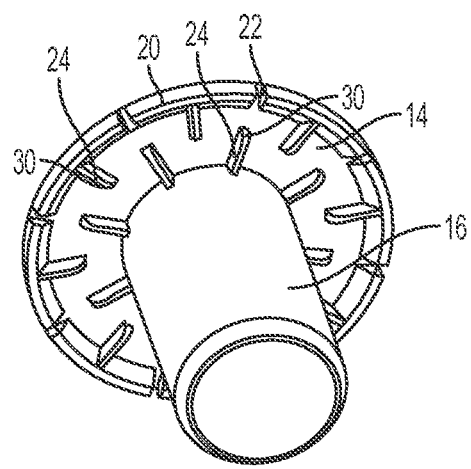

The exemplary embodiment of FIG. 5 also substantially corresponds to the exemplary embodiment of FIGS. 1 and 2. Again, the sole difference regards the design of the anchoring ribs 24. In the exemplary embodiment of FIG. 5, the anchoring ribs 24 again extend non-continuously in the radial direction between the outer boundary 20 and the hollow cylindrical section 16 forming the inner boundary. On the contrary, anchoring ribs 24 which extend inward from the outer boundary 20 over a section of the radial extension and anchoring ribs 24 which extend outward from the hollow cylindrical section 16, which forms the inner boundary, over a section of the radial extension are provided in an alternating manner, as seen in the circumferential direction. In addition, it can be seen that the anchoring ribs 24 first of all in each case have a section of uniform height from the outer boundary 20 or the cylindrical section 16 and then, toward their end, have a section 30 which drops in height in a rounded manner. The uniform distribution of the glue over the glue surface is also improved by means of this exemplary embodiment.

Figure 6:
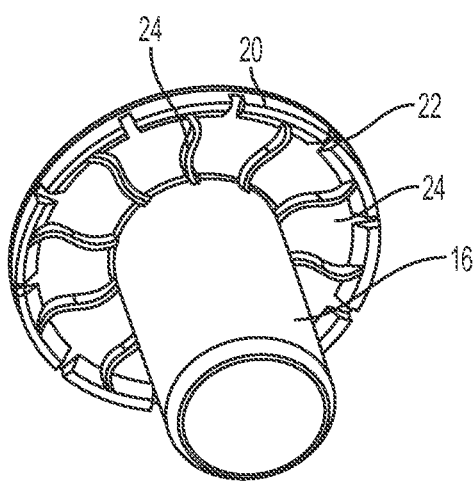
Figure 7:
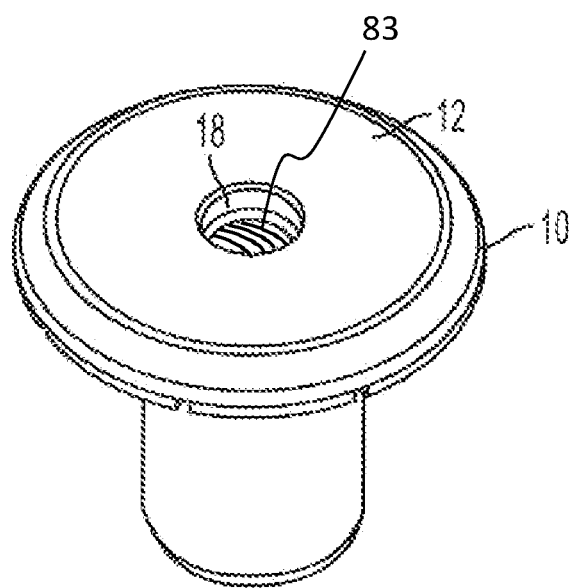
FIG. 7 depicts a fastening element wherein the fastening means comprise thread means 83.
Figure 8:
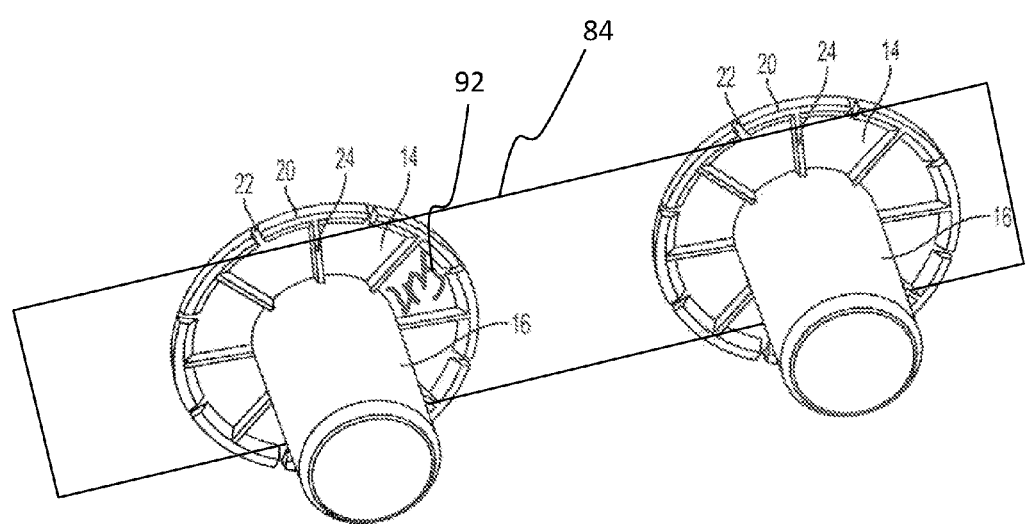
FIG. 8 depicts a fastening device, comprising a first fastening element and comprising a second fastening element identical to the first fastening element, glued to a component 94 by glue 92.

Finally, the exemplary embodiment of FIG. 6 also substantially corresponds to the exemplary embodiment illustrated in FIGS. 1 and 2. The exemplary embodiment of FIG. 6 again differs merely with regard to the design of the anchoring ribs 24 which, in the exemplary embodiment of FIG. 6, extend in a radial direction, but in an S-shaped manner, completely between the outer boundary 20 and the hollow cylindrical section 16 forming the inner boundary. It has been shown that a particularly good connection to the carrier component is achieved by the S-shaped design of the anchoring ribs 24.

Of course, the exemplary embodiments explained above can also be combined with one another. A common feature of all of the exemplary embodiments is that they achieve particularly high durability to torsional and shearing forces without the function of the fastening means being impaired by glue.

The invention claimed is:

1. Fastening element for fastening a component on a carrier component, in particular a carrier component of an automobile, wherein the fastening element comprises a glue surface with which the fastening element can be glued onto the carrier component with a glue applicable to the glue surface, and wherein the fastening element comprises fastening means for fastening the component or a further fastening element, characterized in that a plurality of anchoring ribs are provided on the glue surface, which extend at least in sections in a radial direction with regard to an imaginary circle around the center of the glue surface, wherein at least one of:
   (i) the glue surface comprises a ring-shaped circumferential inner boundary heightened with regard to the glue surface and/or a ring-shaped circumferential outer boundary heightened with regard to the glue surface, and the inner boundary and/or the outer boundary comprise at least one interruption; or
   (ii) the glue surface includes a plurality of boreholes therethrough, the boreholes being arranged in a circumferential path.

2. Fastening element according to claim 1, wherein the fastening element comprises a closed glue surface.

3. Fastening element according to claim 1, wherein the glue surface has a circular shape or a circular ring shape, wherein the anchoring ribs extend in a radial direction with regard to the circular shape or the circular ring shape of the glue surface.

4. Fastening element according to claim 1, wherein some or all of the anchoring ribs extend continuously between an inner boundary or a center of the glue surface and an outer boundary of the glue surface.

5. Fastening element according to claim 1, wherein some or all of the anchoring ribs extend non-continuously between an inner boundary or a center of the glue surface and an outer boundary of the glue surface.

6. Fastening element according to claim 1, wherein some or all of the anchoring ribs extend along a wave form in radial direction.

7. Fastening element according to claim 1, wherein some or all of the anchoring ribs comprise at least one deepening along their radial extension, through which deepening glue can flow when the fastening element is glued onto the carrier component.

8. Fastening element according to claim 1, wherein some or all of the anchoring ribs have a changing height in radial direction.

9. Fastening element according to claim 1, wherein the glue surface comprises the ring-shaped circumferential inner boundary heightened with regard to the glue surface and/or the ring-shaped circumferential outer boundary heightened with regard to the glue surface.

10. Fastening element according to claim 9, wherein some or all of the anchoring ribs have the same height as the inner boundary and/or the outer boundary.

11. Fastening element according to claim 9, wherein the inner boundary and/or the outer boundary comprise at the least one interruption.

12. Fastening device, comprising a first fastening element provided according to claim 1 and comprising a second fastening element, which comprises fastening means for fastening the component, wherein the fastening means of the second fastening element is the same design as the fastening means of the first fastening element.

13. Carrier component comprising a fastening element according to claim 1 which is glued onto the carrier component with its glue surface with glue.

14. System of a carrier component according to claim 13 and a component fastened on the fastening means of the fastening element or a further fastening element fastened on the fastening means of the fastening element.

15. The fastening element of claim 1, wherein the fastening means is mounted to the glue surface on a same side at the anchoring ribs.

16. The fastening element of claim 1, wherein the glue surface includes the plurality of boreholes therethrough, the boreholes being arranged in a circumferential path.

17. The fastening element of claim 1, wherein the fastening element includes a hollow cylindrical section and a disk section located at an end of the hollow cylindrical section, wherein the disk section includes the glue surface and ribs.

18. The fastening element of claim 1, wherein the fastening element includes a hollow cylindrical section and a disk section located at an end of the hollow cylindrical section, wherein the disk section includes the glue surface and ribs on a first side that faces the hollow cylindrical section and the disk section includes a flat smooth surface on a second side opposite the first side.

19. The fastening element of claim 1, wherein the fastening element includes a hollow cylindrical section and a disk section located at an end of the hollow cylindrical section, wherein the disk section includes the glue surface and ribs on a first side, wherein the first side faces the hollow cylindrical section, and wherein the disk section includes an opening on a second side opposite the first side, which opening opens into the hollow portion of the hollow cylindrical section.

20. The fastening element of claim 1, wherein the fastening element includes a hollow cylindrical section and a disk section located at an end of the hollow cylindrical section, wherein the disk section includes the glue surface and ribs, wherein the hollow cylindrical section has a smooth surface on the outside extending from the ribs to an opposite end of the hollow cylindrical section.

21. The fastening element of claim 1, wherein the fastening element includes a hollow cylindrical section and a disk section located at an end of the hollow cylindrical section, wherein the disk section includes the glue surface and ribs, wherein the disk section extends outward from the hollow cylindrical section a distance about half as long as the distance that the cylindrical section extends from the disk section.

22. A fastening element for fastening a component to a carrier component of an automobile, the fastening element comprising:
   a circular bearing section having a first circumference and a second circumference;
   a central passage bore substantially in the center of at least one of the first or second circumference;
   a glue surface that extends in a circular ring shape about the central bore;
   a cylindrical section that extends from the glue surface; and
   a plurality of anchoring ribs on the glue surface, which extend at least in sections in a radial direction with regard to an imaginary circle around the center of the glue surface,
   wherein
   the glue surface is configured to be glued onto the carrier component with a glue applicable to the glue surface, and
   the cylindrical section is configured as a fastening means for fastening the component or a further fastening element.

* * * * *